(12) United States Patent
Khoon (10) Patent No.: US 8,997,407 B2
(45) Date of Patent: Apr. 7, 2015

(54) CONTAINER DEPOT

(75) Inventor: Tan Yeow Khoon, Singapore (SG)

(73) Assignee: SH Cogent Logistics PTE Ltd, Singapore (SG)

( * ) Notice: Subject to any disclaimer, the term of this patent is extended or adjusted under 35 U.S.C. 154(b) by 192 days.

(21) Appl. No.: 12/698,707

(22) Filed: Feb. 2, 2010

(65) Prior Publication Data

US 2010/0192486 A1 Aug. 5, 2010

(30) Foreign Application Priority Data

Feb. 2, 2009 (SG) ................................ 200900713-9

(51) Int. Cl.
*E04H 1/00* (2006.01)
*B65G 63/00* (2006.01)

(52) U.S. Cl.
CPC .................................... *B65G 63/004* (2013.01)

(58) Field of Classification Search
CPC .. B65G 63/025; B65G 63/045; B65G 63/002; B65G 63/008; B65G 63/004; B65G 1/04728; B65G 1/0464; B65G 1/0492; B65G 3/36; B65G 57/24; B65G 7/02; B65G 9/004
USPC ........................ 52/173.1, 79.1, 79.2, 79.7, 29; 414/139.4, 139.9, 140.3, 140.4, 141.3
See application file for complete search history.

(56) References Cited

U.S. PATENT DOCUMENTS

| | | | |
|---|---|---|---|
| 5,511,923 A * | 4/1996 | Dunstan | 414/139.9 |
| 5,876,172 A * | 3/1999 | Di Rosa | 414/139.9 |
| 6,698,990 B1 * | 3/2004 | Dobner et al. | 414/139.9 |
| 2002/0102150 A1 | 8/2002 | Dunstan | |
| 2006/0182525 A1 | 8/2006 | Kroll et al. | |
| 2008/0219804 A1 * | 9/2008 | Chattey | 414/140.3 |

FOREIGN PATENT DOCUMENTS

| | | |
|---|---|---|
| EP | 10250171 | 4/2010 |
| GB | 2342093 | 5/2000 |
| JP | 11059812 | 3/1999 |
| WO | 95/31396 | 11/1995 |
| WO | WO 01/31144 | 5/2001 |
| WO | WO 2004/074147 | 9/2004 |
| WO | WO 2006/035271 | 4/2006 |
| WO | PCT/SG2010/000030 | 2/2010 |

* cited by examiner

*Primary Examiner* — Jessica Laux
(74) *Attorney, Agent, or Firm* — Intellectual Property Law Group LLP (57) ABSTRACT

A building structure comprises a roof having a top surface and the top surface adapted to store shipping containers. At least one floor is positioned beneath the roof, and at least one shipping container handling equipment is mounted on the top surface. The shipping container handling equipment is adapted to move the shipping containers onto and off of the roof.

27 Claims, 8 Drawing Sheets

CONTAINER DEPOT

RELATED PATENT DATA

The present patent claims priority under 35. U.S.C. §119 to priority Singapore Patent Application No. 200900713-9 which was filed Feb. 2, 2009, the entirety of which is incorporated by reference herein.

FIELD OF THE INVENTION

The present invention relates to a building structure for storing containers, and more particularly to a building structure having a roof.

BACKGROUND OF THE INVENTION

Size of cargo/shipping containers (herein after sometimes referred to as "containers") is often expressed by a twenty-foot equivalent unit (TEU) term. The TEU is an inexact unit of cargo capacity often used to describe the capacity of container ships and container terminals. One TEU container is generally 20' (6.1 m)×8' (2.4 m)×8.5 feet (2.6 m) (length, L×width, W×height, H) in size. A TEU is based on the volume of a 20-foot long intermodal container, a standard-sized metal box which can be easily transferred between different modes of transportation, such as ships, trains and trucks. While the TEU is not itself a measure of mass, some conclusions can be drawn about the maximum mass that a TEU can represent. The maximum gross mass for a 20-foot (6.1 m) dry cargo container is 24,000 kilograms (53,000 lb). Subtracting the tare mass of the container itself, the maximum amount of cargo per TEU is reduced to approximately 21,600 kilograms (48,000 lb).

Twenty-foot, "heavy tested" containers are available for heavy goods such as heavy machinery. These containers allow a maximum weight of 67,200 pounds (30,500 kg), an empty weight of 5,290 pounds (2,400 kg), and a net load of 61,910 pounds (28,080 kg).

A two TEU has an L×W dimension of 40' (12.2 m)×8' (2.4 m) size which is also sometimes referred to as forty-foot equivalent unit (FEU). Regardless of the size of containers, each is generally limited to have a payload of not much more than 30 tons. These containers are designed and manufactured according to IICL standards for loading and sealing intact onto container ships, railroad cars, planes, and trucks. The containers are constructed with sturdy metal (usually aluminum or steel based) and structured to withstand rough handling. The containers (loaded or emptied) are often stacked on top of another for storing and warehousing.

Containers can be owned by a shipper, a leasing lines, or a carrier, for example. When the goods are unloaded from the containers, the containers are stored for a future shipment. Common container depots require proper setup to manage and handle container transfers and stacking. This involves a lot of manual intervention. The container depot also requires repair and maintenance facilities for handling, welding, cutting, spray jet cleaning, painting and metal treatment for the containers.

The containers are either stored at port or with common container depot who handles containers from different owners. The containers require regular inspections, testing, proper storage and handling for reuse. Storage and handling of these containers are often a concern.

Containers are normally stored in open spaces. Stackable height of containers is limited by the equipments used. Current container depots may be stacked up to 10 containers high. A 10 hectares area may accommodate 10,000 one TEU containers with about 10 containers in a stack. Due to the large size of the container stackers, the numbers of container stackers operating, and access ways for tow heads and trailers in the yard, the container storage area usually occupies only about 60% of a total land area of the container depot. The remaining 40% of the total land area is left for operational use.

A container stacker operator's cabin is usually at the same height as the 3rd or 4th stack of containers stored. The operator has to look up and observe carefully while stacking the containers above this level to ensure a proper stacking. The higher the stack height, the more difficult it would be to observe as the container stacking may be out of the operator's line of vision. Improper handling during lifting may cause a container to fall resulting in serious injuries or fatality.

Container loading and unloading operations include survey, inspection and verification of the identification of containers. This is time consuming. Many container depots carry out their surveying on public roads which results in heavy traffic congestions. It is common to see up to 20 or more container trucks along the road outside the loading/unloading container depot. Such traffic congestions not only block out the road and cause traffic jams, it may potentially give rise to road safety issues.

For container depots, therefore there is an existing need to enhance land plot ratio and reduce depot footprint, and to address operational safety and traffic congestion. In a region where land is scarce and expensive, such as Singapore, Hong Kong, Shanghai etc., maintenance of a high level of safety, security and optimal storage is always a challenge.

SUMMARY OF THE INVENTION

In accordance with an aspect, a building structure, comprises a roof having a top surface, the top surface adapted to store shipping containers. The building structure also has at least one floor beneath the roof and at least one shipping container handling equipment mounted on the top surface. The shipping container handling equipment is adapted to move the shipping containers onto and off the roof.

From the foregoing disclosure and the following more detailed description of various embodiments it will be apparent to those skilled in the art that the present invention provides a significant advance in the technology of marketing products. Particularly significant in this regard is the potential the invention affords for providing a building structure with a reduced footprint. Additional features and advantages of various embodiments will be better understood in view of the detailed description provided below.

It should be understood that the appended drawings are not necessarily to scale, presenting a somewhat simplified representation of various features illustrative of the basic principles of the invention. The specific design features of the building structure as disclosed here, including, for example, the specific dimensions of the roof, will be determined in part by the particular intended application and use environment. Certain features of the illustrated embodiments have been enlarged or distorted relative to others to help provide clear understanding. In particular, thin features may be thickened, for example, for clarity of illustration. All references to direction and position, unless otherwise indicated, refer to the orientation illustrated in the drawings.

DETAILED DESCRIPTION OF CERTAIN EMBODIMENTS

It will be apparent to those skilled in the art, that is, to those who have knowledge or experience in this field, that many variations are possible for building structures adapted to store containers on its roof disclosed here. The following detailed discussion of various alternate features and embodiments will illustrate the general principles of the invention with reference to a building structure adapted to store containers on its roof. Other embodiments suitable for other applications will be apparent to those skilled in the art given the benefit of this disclosure.

The present invention provides a building structure with a roof is used for cargo/shipping containers storage. This allows for enhanced land usage as the lower levels could be used for unloading/loading and storage of containers and other uses as described in greater detail below.

The roof has a top surface and this top surface is adapted to store containers. The top surface may also have loading/unloading areas. The building structure would also have at least one floor, and hence there would be at least one floor beneath the roof. The number of floors in the building structure can be limited by the height restriction imposed by the relevant authorities or other practical limitations.

The top surface would also have at least one shipping container handling equipment mounted on it. The shipping container handling equipment is adapted to move the shipping containers onto and off of the roof. The shipping container handling equipment can be, for example, a crane. This crane can be an overhead crane and can be movable back and forth along the roof. In addition to a crane, the shipping container handling equipment can also be a lifter, forklift or a reach stacker, or a combination thereof. The shipping container handling equipment can have a load carrying capacity of at least one empty container, or at least 24,000 kg, or at least 30,500 kg. The shipping container handling equipment can also be extendable over a side of the building structure, thereby allowing the shipping container handling equipment to lift containers up to and off the roof.

The roof can also have an opening. The opening can be large enough to allow a container to pass from the roof to an adjacent floor. The adjacent floor and any other lower floors can also have similar openings, thereby allowing a crane to lower a container through the adjacent floor or any other lower floor. There can be allotted parking spaces for carrier trucks (carrier trucks are trucks that transport containers, and have a truck cab where the truck driver sits) in the lower floors. These allotted parking spaces can optionally correspond vertically with openings of the above floor, such that the shipping container handling equipment can lift the containers directly off or onto the carrier trucks. Optionally, when the carrier trucks are parked in the allotted parking space, the opening in the above floor does not extend to the truck cab. Hence, the truck driver can be protected in the event of a falling container.

The building structure can also have barriers which extend above the roof. These barriers can be, for example, wire fences, walls, metal claddings, or a combination of these, to prevent containers toppling from strong weather conditions. The barriers could start from the base of the roof, and then extend upwards, or from the ground, or from a certain height above the ground, or a combination of both, so long as it reduces the risk of containers toppling.

The building structure can also have a ramp which connects the lower floors to each other and to the roof. The ramp allows carrier trucks to access every level including any lower floor and the roof. The ramp can be, for example, a circular ramp and may be one-way or two-way. Preferably, a private road leading towards the ramp, the ramp itself, and each lower floor and roof parking areas would easily accommodate more than 40 container trucks at any one time. The shipping container handling equipment is adapted to unload shipping containers from the truck onto the top surface of the roof, for example.

The lower floors may allow container trucks to pass through the building structure, from one end to the other. The lower floors can also have a container maintenance and handling facility. The lower floor can also have a container inspection facility. Having the container inspection facility away from the road side (many container depots still practice container surveying at the road side) reduces the risk of container surveyors involved in traffic related accidents on public roads and allow for faster turnaround of container trucks. This would reduce traffic congestions on public roads and related road safety hazards. Containers that had been inspected, repaired, and/or washed can be transferred by the shipping container handling equipment through the openings to the roof. The lower floors can also be used as a warehouse, office space and/or a general industrial space. Alternatively, the container maintenance and handling facilities and a container inspection facility may be housed on the building roof.

The containers can be arranged on the top surface in accordance with the owner of the container. The containers can be stacked, preferably at least nine containers high and can be stacked up to twenty or thirty containers high. The container can have a cargo capacity of at least one twenty-foot equivalent unit (TEU).

Figure 1:
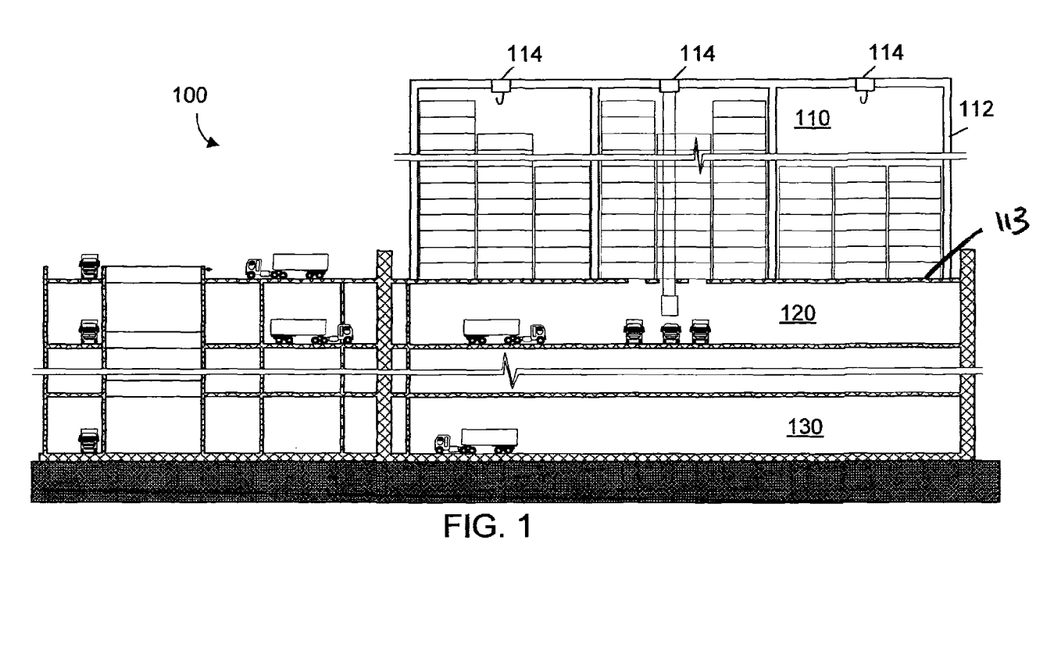
FIG. 1 illustrates a schematic side view of a building structure in accordance with one embodiment.

FIG. 1 illustrates a schematic side view of a building structure 100 in accordance with one embodiment of the present invention. The building structure 100 is a multi-storey building structured for warehousing containers. The upper floors of the building structure 100 are provided for storing the containers. Particularly, the containers are stacked on a top surface 113 of the roof 110 of the building structure 100. Below the roof 110 is a lower floor 120 which can include container inspection, repair, maintenance and handling facilities, and loading/unloading bay. The lower stories, includes a ground floor 130, which can receive or define general-purpose office spaces, which may include warehouses. Additional floors between the ground floor 130 and lower floor 120 may optionally be provided.

Warehousing of the containers on the roof 110 follows generally the container standards provided under IICL regulations. The containers are stacked on top of another within the storage space on the roof 110. The rows of stacked containers are positioned generally according to the owners. In FIG. 1, the roof 110 is shown with overhead cranes 114 for loading/unloading the containers onto/from the trucks.

The roof 110 includes high-rise fences 112 to fence in the storage space. Preferably, the high-rise fences 112 are at least more than 9 containers height. The high-rise fences 112 provide wind resistance and prevent accidental toppling of containers. Height of high-rise fences may depend on the geographical location of the building structure 100 and the intended number of containers to be stacked.

When space is not a concern, nine or lesser containers in a stack would result in sufficient storage capacity, and thus, high-rise fences may not be required. However, when space is scarce, there would be a need to increase the storage capacity by having higher tier stacks. The higher level stacks would thus require the fences. Advantageously, a building structure on 10 hectares land, for example, would be able to provide more than 2.5 times the storage capacity per area of land or footprint as compared to the conventional ground storage techniques. Further, as the lower floors of the building structure 100 can be used for other purposes, this further promotes space economization. Moreover, the usage of space can be further optimized as the trucks can line up within the building 100 (including the ramp 105) during operations, which will lighten traffic congestions and related road safety hazards on public roads.

In accordance with one embodiment, the high-rise fences 112 are solid walls. In accordance with an alternative embodiment, the high-rise fences 112 are wire fences. In yet another embodiment, the roof 110 is built with walls in combination with wire fences.

In accordance with an alternative embodiment, the roof 110 is has a shelter such as a non-structural shelter to provide additional protections to the containers stored therein. Non-structural is used herein to mean that the shelter would have insufficient strength to support a container.

Figure 2:
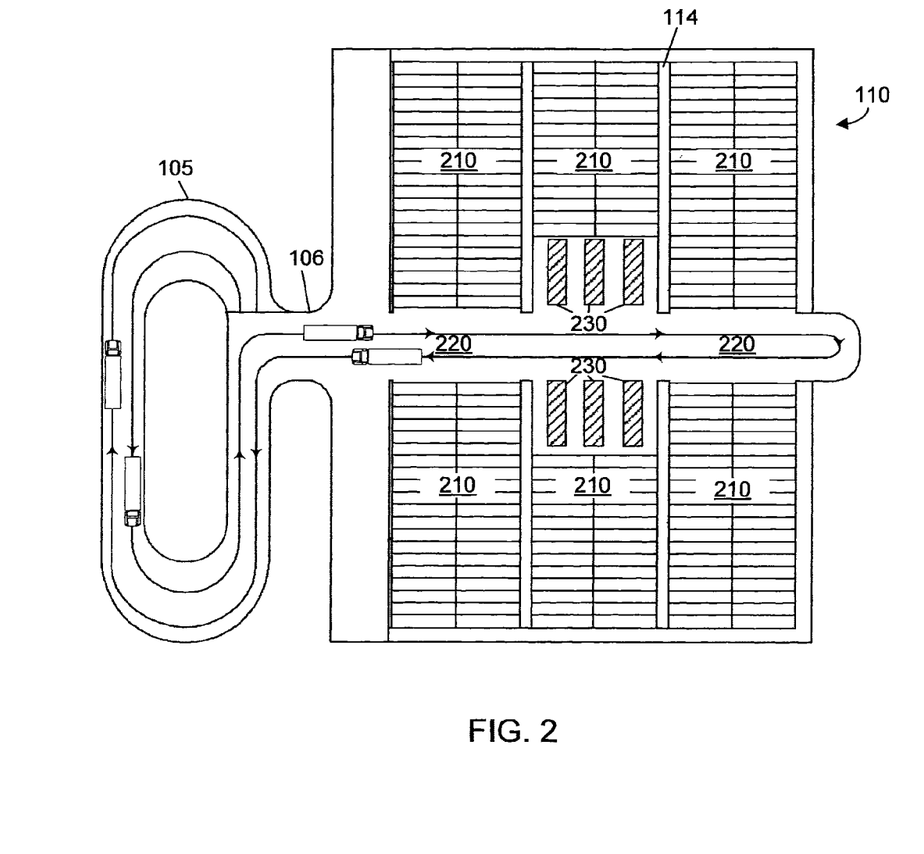
FIG. 2 illustrates a top plan view of a roof.

FIG. 2 shows the building structure 100 further having a ramp 105 for connecting the upper floors to the ground. The ramp 105 allows the vehicles to drive through and access the upper floors, and roof. The ramp 105 is shown here to be a two-way driveway that allows the vehicles to travel in two ways simultaneously. Along the driveway of the ramp 105, there are pathways 106 that connect to the roof 110.

FIG. 2 also shows storage areas 210 on the top surface of the roof 110, a driveway 220 and the loading/unloading bay 230. The storage areas 210 can be laid out according to the size and owner of the containers. Optionally, containers with the same size and the same owner are stacked together for handling. As the containers are handled by overhead cranes 114, the containers can be effectively stacked in close proximity to reduce total the storage space. The driveway 220 is provided at the center of the rooftop 110 with the storage areas 210 provided at the two sides of the driveway 220. The driveway 220 joins to the pathway 106 that allows the trucks from the ramp 105 to drive onto the rooftop 110. The top surface 113 of the roof and the lower floors have openings, and are sized such that the overhead crane 114 can move containers through the lower floors and to the roof and vice versa.

The overhead crane 114 allows faster turnaround of containers thus greatly reducing truck waiting time and traffic congestion. In contrast, a container stacker must remove containers from the outer stacks before being able to access the inner stack. By way of example, to remove the last container in a row of 9 deep and 10 high, the container stacker is required to move 89 containers before retrieving the last container, whilst the overhead crane needs only to travel to the last row and remove 9 containers before retrieving the required last container.

Figure 3:
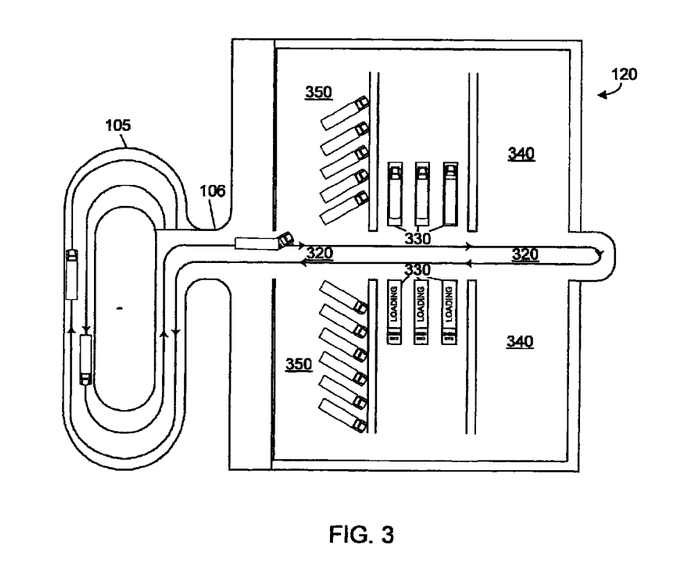
FIG. 3 illustrates a top plan view of a lower floor.
Figure 4:
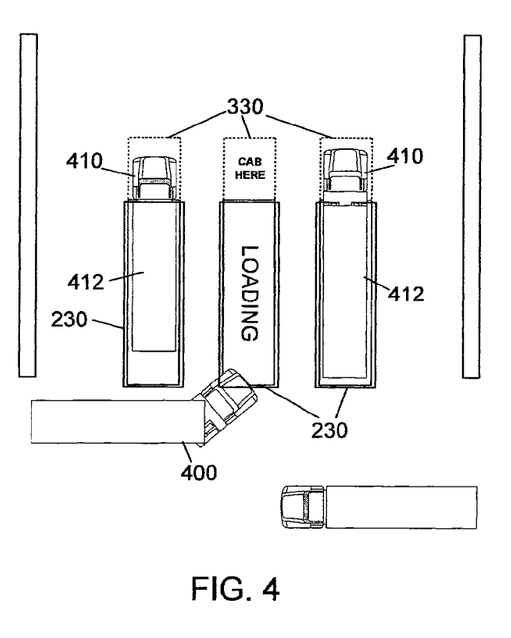
FIG. 4 is a close up view of a loading/unloading bay.

FIG. 3 illustrates a top plan view of the lower floor 120 of FIG. 1 in accordance with one embodiment of the present invention. The lower floor 120 is built in a layout that corresponds to the rooftop 110 of FIG. 2. The lower floor 120 includes a driveway 320, loading/unloading bays 330, a container maintenance and handling section 340 and a container inspection terminal 350. The driveway 320 is provided at the center of the lower floor 120 with the loading/unloading bays 330, the container maintenance and handling section 340 and the container inspection section 350 situated at both sides of the driveway 320. The driveway 320 joins to the pathway 106 that allows trucks from the ramp 105 to drive into the lower floor 120. The loading/unloading bays 330 are situated right beneath the loading/unloading bays 230. The loading/unloading bays 330 include parking lots that correspond to the floor openings of the roof 110. As shown in FIG. 4, which is an enlarged view of the loading/unloading bay 230 of FIG. 2 with the parking lots of FIG. 3 shown in phantom, each opening is arranged to offset from the corresponding parking lot in a manner such that when a truck 400 is parked on the parking lot, only the container 412 is exposed to the opening, while the truck's cab 410 is hidden under the roof.

Operationally, a truck loaded with a container arrives at the building structure 100, and drives through the ramp 105 and enters the lower floor 120 for inspections at container inspection terminal 350. When necessary, the container may further be sent to the maintenance and handling section 340 for maintenance and handling works, which include repairing and the like. Once the container has passed the inspections, the truck is parked at a parking lot of the loading/unloading bay 330. The overhead crane 114 mounted on the roof 110 picks up the container through the opening and stacks accordingly at the storage area 210.

Once the container is lifted from the truck, the truck can move away. It should be noted that during this process, the driver need not be present and the work is done by the shipping container handling equipment which may include lifters or overhead cranes 114.

Figure 5A:
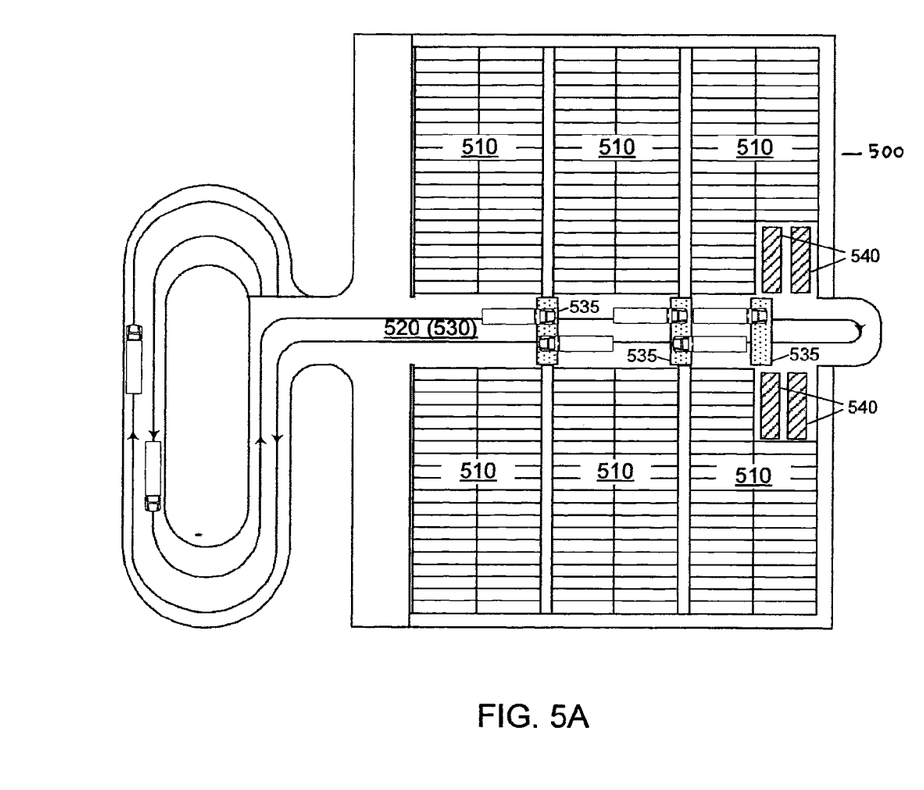
FIG. 5A is a top plan view of another embodiment.

The overhead cranes 114 can be electric operated type cranes, which advantageously have reduced noise and emissions. The overhead cranes 114 may include a trans lancer system. The building structure 100 is adapted to withstand weights of containers when the floor is fully loaded with full containers FIG. 5A illustrates a top plan view of a roof of the building structure 100 in accordance with another embodiment of the present invention. The roof 500 includes a storage area 510, a driveway 520, a plurality of loading area 530 and a plurality of floor openings 540. The storage areas 510 are laid out according to the size of the containers, preferably, it is arranged and managed in accordance with owners of the containers for easy access. The driveway 520 is provided at the center of the roof extending to the other end of the building structure 100 with the storage areas 510 situated at the two sides of the driveway 520. The loading areas 530 are provided along the driveway 520 where loading/unloading of the containers from the trucks are carried out along the loading areas 530 (along the driveway 520). Each loading area 530 is laid out with a loading lot 534 and a shed 535. The shed 535 are inter-building structures adapted for protecting the trucks' cab while loading and unloading the containers. The sheds 535 can be simple roofed structures built across the driveway 520 with a passage of a loaded truck height for allowing loaded truck to pass through the driveway 520 without disruption. The width of the sheds 535 is at least catered for a length of a truck cab, so that the truck cab can be hidden. Towards the end of the building, relative to the ramp of the building, the floor openings 540 are provided for allowing access between the roof 500 and the floor beneath it, i.e. a lower floor. Similarly, each floor opening 540 is sized for allowing at least one container to be lifted from a lower floor to the roof.

Accordingly, the overhead crane may include a rotatable spreader for allowing containers to be lifted through the floor openings 540 and stacked directly at the storage area 510 without any obstruction. In an alternative embodiment, the container storage area, loading area 530 and the floor openings 540 are adapted with a consistent orientation to avoid the rotatable spreader.

Figure 5B:
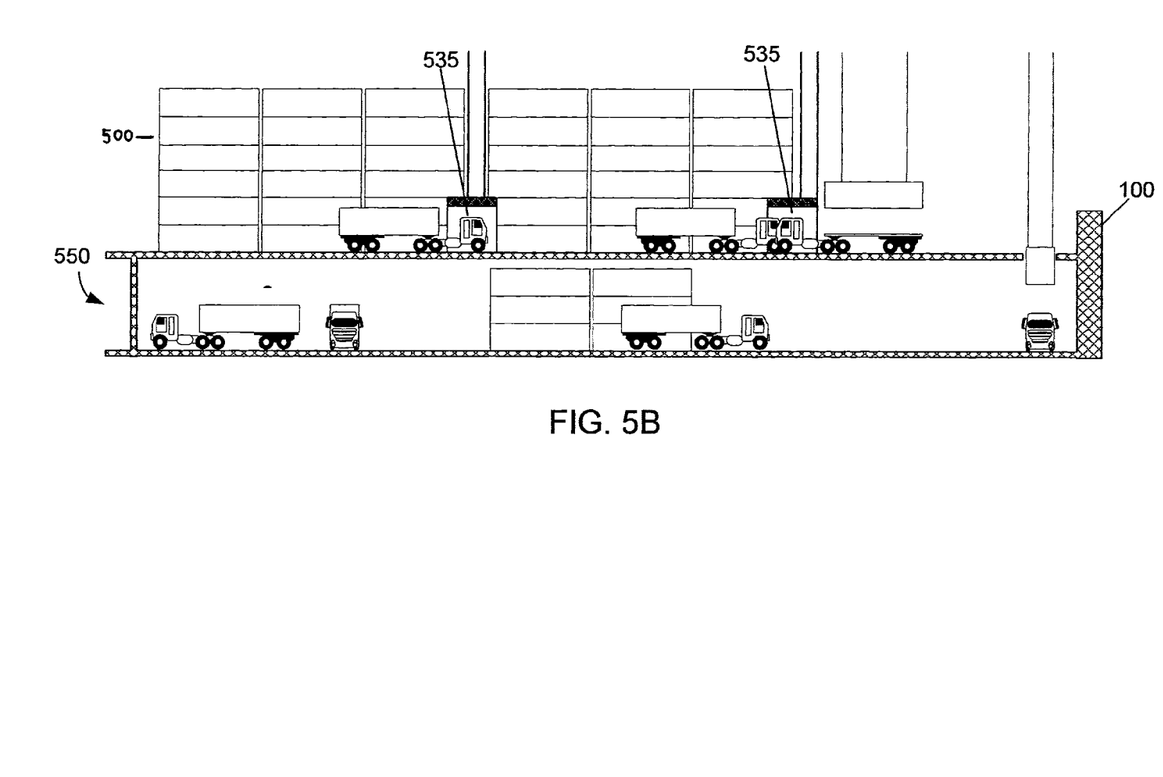
FIG. 5B is a schematic side view of the embodiment of FIG. 5A.
Figure 5C:
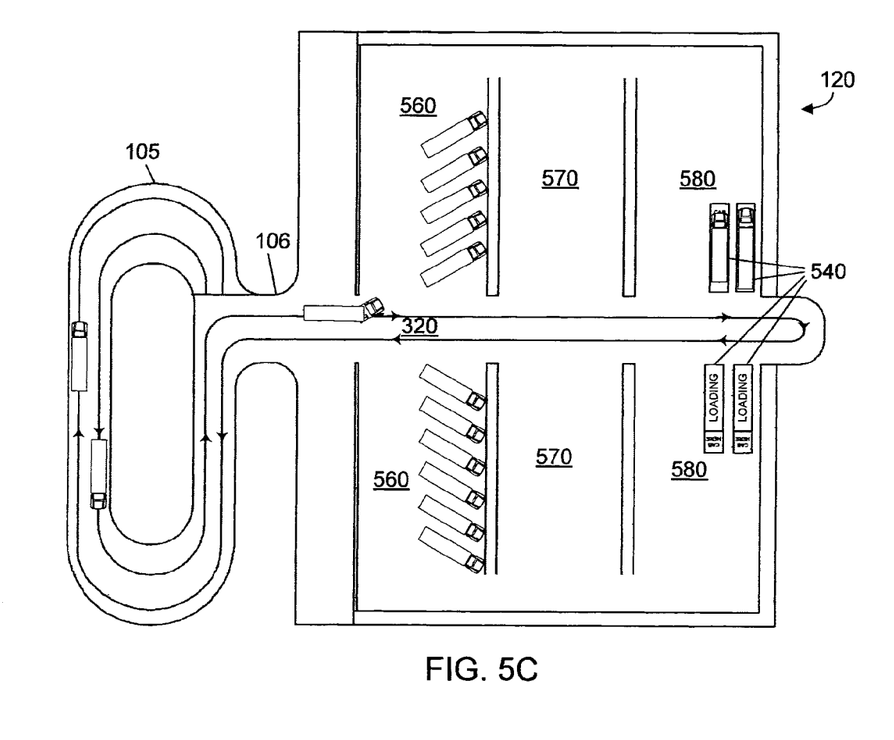
FIG. 5C is a top view of the lower floor of FIG. 5B.

FIG. 5B illustrates a side view of the building structure 100 in accordance with one embodiment of the present invention. The building structure 100 comprises the roof 500 and lower floor 550. As shown, when the trucks drive up to the roof 500, they travel along the driveway 520 and park at one of the loading areas 530 for loading and unloading container. When the trucks are parked at the loading/unloading area 530, the truck cab is covered under the shed 535. Loading/unloading operations are carried out during then. Similar to that of the floor openings of the roof 110 of FIG. 1, the shed 535 provides protections to the trucks' drivers during the loading/unloading operations by covering the truck cab beneath it In another embodiment, the shed 535 is used as a platform on the driveway 520 for stacking containers thereon. FIG. 5C shows a top plan view of the lower floor 550 in accordance with one embodiment. The lower floor 550 comprises a container inspection terminal 560, containers warehousing area 570 and a container maintenance and handling section 580. The container inspection terminal 560 is generally a parking area with parking lots, where the loaded trucks are parked there for necessary inspections. The container maintenance and handling section 580 is provided for carrying out containers maintenance and repair, as required. The floor openings 540 of the roof 500 are situated at the container maintenance and handling section 580 that allows overhead cranes to pickup containers from the lower floor 550 for stacking/storing on the roof 500. When necessary, the containers can be stored temporary at the containers warehousing area 570. Depending on the floor height, it is sufficient for the lower floor 550 to allow 2-3 tiers stack within the lower floor 550.

Referring back to FIG. 5C, loaded trucks are inspected and surveyed at the container inspection terminal 560. The parking areas provided at the container inspection terminal 560 shall ease up the traffic at peak periods. The containers that require maintenance or repair can be sent to the container maintenance and handling section 580. When necessary, the containers can be stored at the container warehousing area 570 and/or transferred to the roof 500 directly through the floor openings 540.

It will be readily understood to those skilled in the art, given the benefit of this disclosure, that the roof shall be structured to withstand weight of stacked loaded containers with necessary reinforcements. The high-rise fences may also be reinforced with metal cladding for safety and noise reduction. Also, the container warehousing control can take place indoors, and container traffic and storage control can be at least partially automated to reduce manpower required.

Operating and proper accounting of containers require good management in the area of accounting and systematic stacking and identification of boxes. Trained personnel including drivers, technicians and good computer management system will be required to ensure efficiency, safety and fast movement. Costing for boxes depends upon quantity, space required in TEUs, handling in and out charges, inspection, maintenance and repairs and other lifting charges.

Figure 6A:
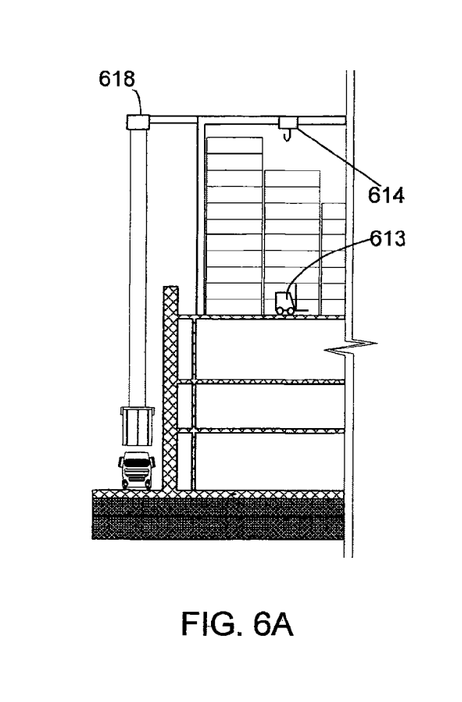
FIG. 6A is a schematic view of a building structure in accordance with another embodiment of the present invention.

FIG. 6A illustrates another alternative embodiment with a building structure 600 similar to that of the FIG. 1. The building structure 600 comprises a multi-storey structure 620 having a roof 610, one or more shipping container handling equipment. The shipping container handling equipment may include forklifts 613, lifters 618, overhead cranes 614 and the like adapted for lifting and transporting containers 601 on the roof 610. The lifter 618 is adapted to lift cargo containers between the ground level of the building structure 600 and the roof 610. As shown in FIG. 6A, the lifter 618 is an overhead crane which can extend out from one side of the building structure 600 for picking up the containers from the ground level. Once the containers are lifted to the roof 610, they can be passed on to the shipping container handling equipment 615 for appropriately stacking on the rooftop 610. When the containers are to be loaded onto the trucks, they are picked up from the stacks through the shipping container handling equipment 615, and the shipping container handling equipment 615 passes them over to the lifter 618 for loading onto the trucks parked at the loading bay. Accordingly, the trucks do not need to drive up to the rooftop to load/unload the containers. Similarly, sheds (not shown) may be provided as a safety measure for protecting truck cabs from fallen container. The lifter 618 may be a hydraulic lifter, for example.

Figure 6B:
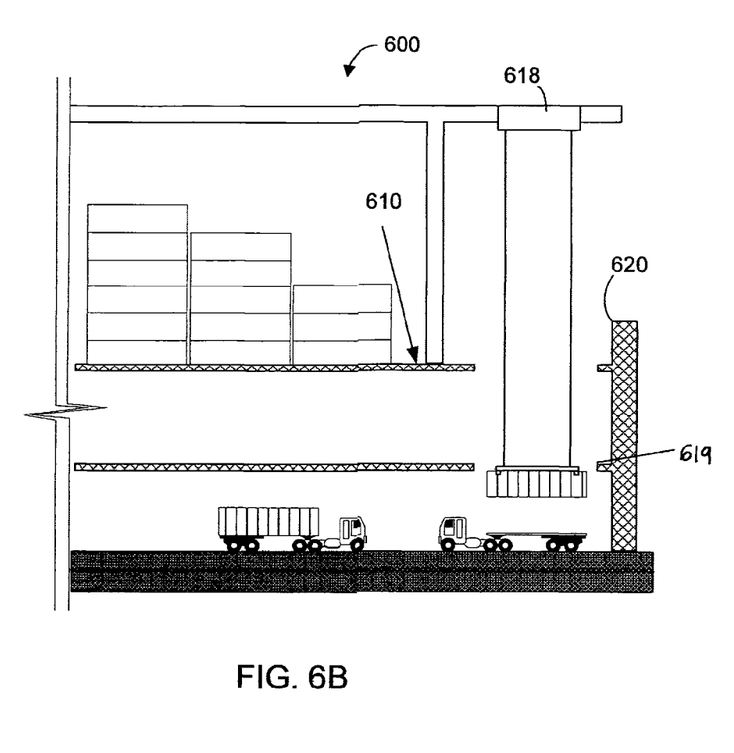
FIG. 6B is a schematic side view of a building structure in accordance with yet another embodiment of the present invention.

In an alternative embodiment as shown in FIG. 6B, the building structure 600 may comprise vertically in-lined floor openings 619 at each intermediate floor of the multi-storey structure 620 that form a path or shaft (when enclosed) in the building structure 600. With the lifter 618 installed directly above the floor openings, the containers may be lifted to the rooftop 610 from the ground level through the floor openings.

The ramp 105 of FIG. 2 optionally may be connected as part of the building structure 600. If a ramp is not used, further land space may be saved.

The present invention has enhanced land plot ratio, and addressed the issues of traffic congestion on public roads. This invention could be used at, but is not limited to, ports and/or inland container depots.

From the foregoing disclosure and detailed description of certain embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A building structure comprising, in combination:
    a roof having a top surface, the top surface adapted to store shipping containers;
    at least one shipping container handling equipment mounted on the top surface, wherein the shipping container handling equipment is adapted to move the shipping containers onto and off of the roof;
    at least two shipping containers are stacked on top of one another on the top surface;
    a permanent barrier which extends above the roof along each side of a perimeter that surrounds the top surface of the roof, preventing toppling of any stored containers over any side of the perimeter from the roof;
    a ramp operatively connects the roof to land; and there are at least two floors beneath the roof and above said land;

wherein the building structure is positioned entirely on said land.

2. The building structure of claim 1, wherein the roof defines an opening large enough to allow one of the shipping containers to pass between the roof and the at least one floor.

3. The building structure of claim 2, wherein the at least one of the floors defines an opening large enough to allow one of the shipping containers to pass through.

4. The building structure of claim 1, wherein the barrier is one of a metal cladding, a wall and a wire fence.

5. The building structure of claim 1, wherein the at least one shipping container handling equipment is extendable over a side of the building structure, allowing the at least one shipping container handling equipment to lift shipping containers up to and off of the roof.

6. The building structure of claim 1, wherein the at least one shipping container handling equipment is a crane.

7. The building structure of claim 6, wherein the crane is movable along the top surface of the roof.

8. The building structure of claim 1, wherein the at least one shipping container handling equipment is one of a lifter, forklift and a reach stacker.

9. The building structure of claim 1, wherein the shipping container handling equipment has a load carrying capacity of at least 30,500 kg.

10. The building structure of claim 1, wherein the ramp is also operatively connected to the at least two floors.

11. The building structure of claim 1, further configured to accommodate a driver operated truck vehicle on the roof, the roof accessible by the truck vehicle using the ramp, wherein the at least one shipping container handling equipment is adapted to unload shipping containers from the truck vehicle onto the top surface of the roof.

12. The building structure of claim 1, further comprising a space defined by one of:

the roof and at least one of the floors; and at least one of the floors and another of the floors; and the space is adapted to allow container trucks to pass through.

13. The building structure of claim 12, wherein one of the space and the top surface receives at least one of a container maintenance and handling facility and a container inspection facility.

14. The building structure of claim 13, wherein the space defines at least one of a general office space, a warehouse and a general industrial space.

15. The building structure of claim 1, further comprising loading and unloading areas.

16. The building structure of claim 15, wherein the loading and unloading areas are positioned on the top surface.

17. The building structure of claim 1, wherein the containers are washed at the container maintenance and handling facility.

18. The building structure of claim 1, wherein the shipping containers are arranged on the top surface in accordance with an owner of the shipping containers.

19. The building structure of claim 1, wherein the shipping containers are stackable at least nine shipping containers high.

20. The building structure of claim 1, wherein the shipping containers have a cargo capacity of at least one twenty-foot equivalent unit (TEU).

21. The building structure of claim 1, wherein the shipping container handling equipment has a load carrying capacity of at least 24,000 kg.

22. The building structure of claim 1, wherein the shipping container handling equipment has a load carrying capacity of at least one empty shipping container.

23. The building structure of claim 1, further comprising a non-structural shelter positioned over the roof.

24. The building structure of claim 1, wherein the ramp is naturally ventilated.

25. The building structure of claim 1, wherein the top surface of the roof comprises one or more roof openings and at least the floor adjacent beneath the roof comprises one or more openings, at least one opening of the one or more openings corresponds in location to the one or more roof openings, each of the openings large enough to pass a shipping container.

26. The building structure of claim 25, further comprising parking spaces on one or more floors beneath the roof, wherein each of the parking spaces is arranged to be offset from an opening in an adjacent floor above, such that a container portion of a vehicle parked in a parking space is aligned directly beneath the opening in an adjacent floor above and a driver cab portion of the vehicle remains protected under the adjacent floor above.

27. The building structure of claim 1, further comprising one or more parking spaces on at least the floor adjacent beneath the roof and wherein the top surface of the roof comprises one or more roof openings, the one or more parking spaces configured to be offset from the roof openings such that a container portion of a vehicle parked in a parking space is aligned directly beneath a roof opening and a driver cab portion of the vehicle remains protected under the roof.

\* \* \* \* \*